United States Patent [19]

Sakashita

[11] Patent Number: 4,604,681
[45] Date of Patent: Aug. 5, 1986

[54] FEEDBACK CONTROL METHOD AND SYSTEM HAVING VARIABLE DEADBAND

[75] Inventor: Ryuji Sakashita, Kobe, Japan

[73] Assignee: Mitsubishi Denki Kabushiki Kaisha, Tokyo, Japan

[21] Appl. No.: 765,189

[22] Filed: Aug. 13, 1985

Related U.S. Application Data

[63] Continuation of Ser. No. 454,569, Dec. 29, 1982, abandoned.

[30] Foreign Application Priority Data

Mar. 5, 1982 [JP] Japan .................................. 57-35381

[51] Int. Cl.$^4$ .................... G06F 15/20; G05B 11/01; E02B 7/20
[52] U.S. Cl. .................................. 364/183; 364/148; 364/154; 364/177; 364/510; 405/92
[58] Field of Search .................................. 364/140–143, 364/148, 152–155, 176–177, 180–183, 160, 420, 505–506, 509–510; 318/590–596, 611, 624; 405/80, 92, 107

[56] References Cited

U.S. PATENT DOCUMENTS

| | | | |
|---|---|---|---|
| 3,671,725 | 6/1972 | Bakke | 364/177 X |
| 3,699,720 | 10/1972 | Lenning | 364/183 X |
| 3,794,817 | 2/1974 | Shinskey | 364/177 X |
| 3,942,718 | 3/1976 | Palmieri | 364/183 X |
| 3,958,109 | 5/1976 | Doherty et al. | 364/182 X |
| 3,983,467 | 9/1976 | Bossons et al. | 318/624 X |
| 4,036,023 | 7/1977 | Matsumoto et al. | 405/92 X |
| 4,143,415 | 3/1979 | Klingbeil | 364/182 X |
| 4,288,854 | 9/1981 | Burroughs | 364/160 X |
| 4,332,507 | 6/1982 | Wakamori et al. | 405/92 |
| 4,335,341 | 6/1982 | Ogasawara | 318/624 |
| 4,344,128 | 8/1982 | Frye | 364/183 |
| 4,386,623 | 6/1983 | Funk et al. | 364/183 X |
| 4,387,422 | 6/1983 | Steutermann | 364/183 |
| 4,392,417 | 7/1983 | Johannsen | 364/510 X |
| 4,417,312 | 11/1983 | Cronin et al. | 364/183 X |
| 4,478,534 | 10/1984 | McIlwain | 405/92 X |

*Primary Examiner*—Gary V. Harkcom
*Attorney, Agent, or Firm*—Lowe Price Leblac Becker & Shur

[57] ABSTRACT

An automatic feedback controller for maintaining water level in a dam initially compares target and sensed water levels to derive a deviation value. Simultaneously, a first dead zone having a relatively wide width contiguous to the target level is set. The first set dead zone is compared with the deviation value to open and close a dam gate such that the deviation value becomes smaller than the first dead zone width. When a predetermined time has elapsed, a second dead zone having a width narrower than that of the first dead zone is set. The second dead zone is then compared with the deviation value to open or close the gate such that the deviation value becomes smaller than the second dead zone width.

20 Claims, 5 Drawing Figures

FEEDBACK CONTROL METHOD AND SYSTEM HAVING VARIABLE DEADBAND

This application is a continuation of application Ser. No. 454,569, filed Dec. 29, 1982, now abandoned.

BACKGROUND OF THE INVENTION

1. Field of the Invention

The present invention relates to a feedback automatic control method and apparatus. More specifically, the present invention relates to a feedback automatic control method and apparatus adapted for making feedback control such that a control amount of an object being controlled may correspond with a target value.

2. Description of the Prior Art

A feedback automatic control apparatus adapted for opening or closing a gate by controlling the same such that the water level of a dam may be a target value in a hydraulic power generating station, for example, has been hitherto employed.

FIG. 1 is a block diagram of a conventional feedback automatic control apparatus. Referring to FIG. 1, the structure of a conventional feedback automatic control apparatus will be described. A control portion 1 is adapted to set in a first comparator 2 a target value of the water level of a dam and is also adapted to set in a second comparator 5 a dead zone having a predetermined width $\beta$ contiguous to the target value. The width $\beta$ of the dead zone is set for discontinuing control for opening/closing a gate, not shown, by deeming that the actual water level has reached the target value, if and when the water level of a dam is within such range. The first comparator 2 is supplied with a detected signal from a water level sensor 4 for detecting the actual water level 3 of the dam. The first comparator 2 compares the target value and the actual water level, thereby to evaluate a deviation value to provide the same to the second comparator 5. The second comparator 5 compares the dead zone as set and the deviation obtained from the first comparator 2, so that an operation command signal is applied to a gate driving circuit 6 so that the deviation may be decreased. Accordingly, the gate driving circuit 6 controls the gate of the dam to open/close the same, thereby to change the flow out amount of the water.

FIG. 2 is a graph showing a change of the control amount in the FIG. 1 conventional feedback automatic control apparatus. Now an operation of the conventional feedback automatic control apparatus will be described. The control portion 1 sets in the second comparator 5 a dead zone having a predetermined width $\beta$ shown in FIG. 2 and provides the first comparator 2 with a target value contiguous to the upper limit of the dead zone. The first comparator 2 compares the water level detected by a water level sensor 4 at the start of control and the target value, thereby to evaluate a deviation. The second comparator 5 compares the deviation supplied from the first comparator 2 and the dead zone, thereby to provide the gate driving circuit 6 with an operation command signal associated with the deviation, if and when the detected water level is not within the range of the dead zone. The gate driving circuit 6 is responsive to the operation command signal to open/close the gate, thereby to adjust the water level of the dam. If and when the water level of the dam is within the range of the width $\alpha$ of the dead zone, an operation command signal is supplied from the second comparator 5 to the gate driving circuit 6, thereby to discontinue control for opening/closing the gate.

Since a conventional feedback automatic control apparatus is adapted such that a dead zone having a predetermined width $\beta$ at the start of control is set and the gate is opened/closed such that the opening/closing amount of the gate, i.e. the water level by way of the control amount may be a target value without changing the set dead zone, it follows that opening/closing of the gate is frequently made. More specifically, in the case where the width $\beta$ of the dead zone as set is narrow, the water level by way of the control amount as detected by the water level sensor 4 comes slightly off the target value and each time comes off the dead zone, with the result that the gate is frequently opened or closed. Furthermore, a disadvantage is involved that at the start of control, as shown in FIG. 2, an overshoot of the control amount with respect to the target value is increased. Conversely, by increasing the width $\beta$ of the dead zone, the frequency of opening/closing the gate is decreased; however, an operation could be in a stable state in the case where the actual water level comes off the target value, in which case a disadvantage is involved that accuracy of the actual water level with respect to the target value is degraded.

SUMMARY OF THE INVENTION

Accordingly, a principal object of the present invention is to provide a feedback automatic control method and apparatus capable of decreasing an overshoot of a control amount with respect to a target value at the start of control and capable of stabilizing a control of a machine to be controlled at the steady state.

According to the present invention, a first dead zone including a target value at the start of control and having a relatively wide width is set and an object being controlled is controlled such that the control value of an object being controlled is brought within the range of the first dead zone. After the lapse of a predetermined time period, a second dead zone having a width narrower than that of the first dead zone is set and the object being controlled is controlled such that the control amount of the object being controlled may be in the range of the second dead zone.

Thus, according to the present invention, since the width of the dead zone is selected to be broader at the start of control, the object being controlled may be simply controlled such that the control amount may be within the range of the dead zone at the start of control, with the result that an overshoot of the control value with respect to the target value can be decreased. Accordingly, an operation frequency of the machine being controlled at the start of control can be decreased. Furthermore, since the present invention is adapted such that the width of the dead zone is selected to be narrower after the lapse of a predetermined time period at the start of control, in a steady state the control amount at that time can be made to correspond with approximately a target value by bringing the control value to be within the range of the dead zone, whereby precision of the control can be enhanced.

In a preferred embodiment of the present invention, the first dead zone of the wide width is supplied to the second comparing means at the start of control and at the same time the target value and the detected control value are compared by the first comparing means, thereby to evaluate the deviation, whereupon the deviation and the first dead zone are compared by the second comparing means, whereby the object being controlled is controlled so that the deviation may be decreased. Based on a time dependent change of a current control amount and the target value, the start time for decreasing the width of the first dead zone and the decreasing time period for decreasing the width of the dead zone for each predetermined width are set in a timer means. When the timer means counts the decrease start time, a decrease of the start of the first dead zone is started, whereupon when an output is obtained from the timer means at every time period, the width of the first dead zone is gradually decreased by each predetermined width until the width of the second dead zone is reached. The second comparing means controls the object being controlled such that deviation may be included within the range of the successively decreasing dead zone.

Therefore, according to the preferred embodiment of the present invention, based on a time dependent change of the current control amount and the target value, the start time for decreasing the width of the first dead zone and the time period for decreasing for every predetermined width can be arbitrarily changed and, if and when a change of the control value is abrupt, a decrease of the width of the first dead zone can be made gradually, while conversely if and when a change of the control amount is gradual, a decrease of the width of the first dead zone can be made abruptly. Thus, according to the preferred embodiment of the present invention, an object being controlled can be controlled in adaptation to a change of the current control amount.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
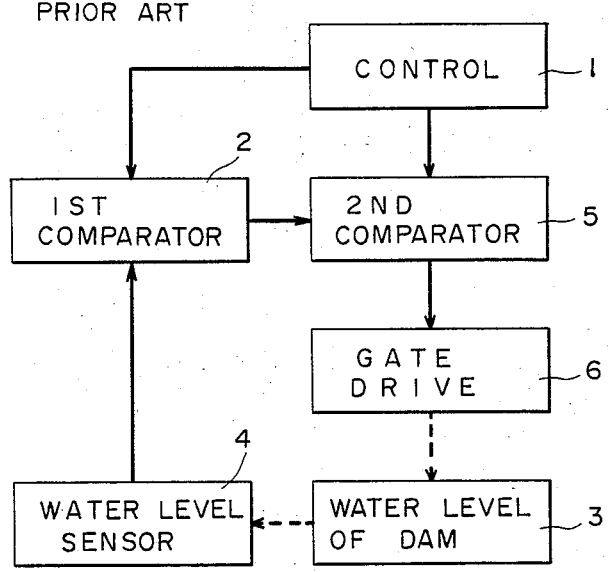
FIG. 1 is a block diagram of a conventional feedback automatic control apparatus.
Figure 3:
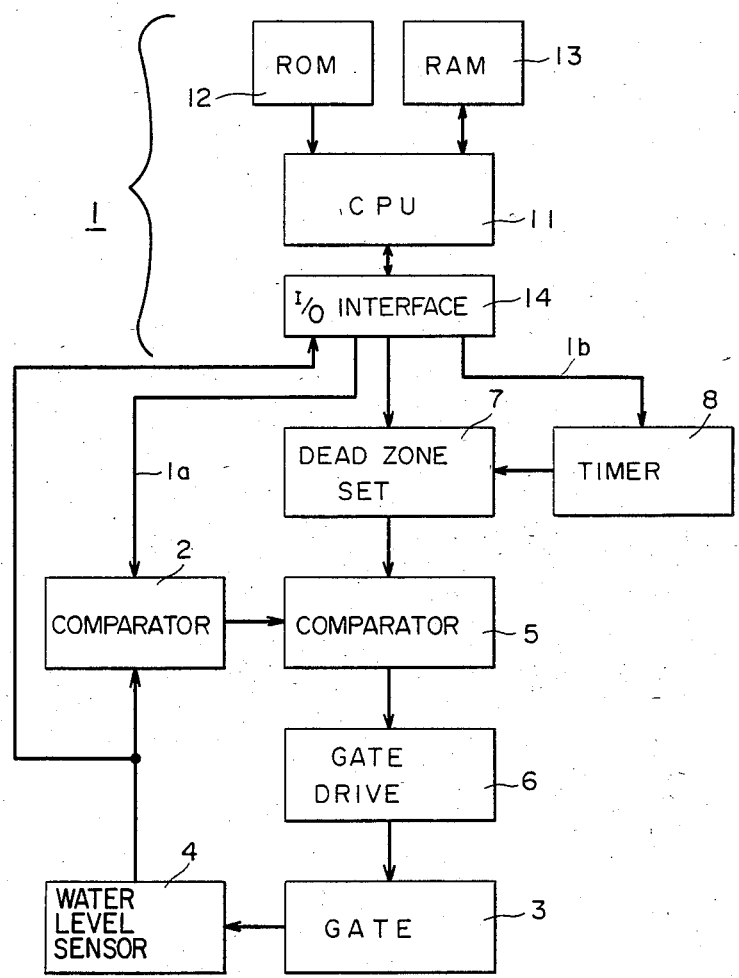
FIG. 3 is a block diagram of one embodiment of the present invention.

FIG. 3 is a block diagram of one embodiment of the present invention. The FIG. 3 embodiment comprises a control portion 1 incremented by a microcomputer and further comprises a dead zone setting portion 7 and a timer circuit 8, while the remaining portions may be the same as those shown in FIG. 1. The control portion 1 comprises a central processing unit 11, a read only memory 12, a random access memory 13, and an input/output interface 14. The central processing unit 11 is supplied with the current water level from a water level sensor 4 through the input/output interface 14. The read only memory 12 is provided for storing a program necessary for performing feedback control. The random access memory 13 is provided for storing data concerning the current water level amount supplied from the water level sensor 4 and for storing the data concerning the result of an arithmetic operation. The central processing unit 11 makes an arithmetic operation of the first dead zone having a relatively wide width having the upper limit value contiguous to the target value in accordance with the program stored in the read only memory 12. The read only memory 12 stores in advance the second dead zone having the width $\beta$ narrower than that of the first dead zone. The dead zone setting portion 7 is provided for storing the first and second dead zones obtained from the control portion 1 and comprises a shift register, for example. The timer circuit 8 is supplied with an operation enable signal from the control portion 1 at the start of control. The timer circuit 8 starts a count operation of the time responsive to the operation enable signal and provides a time output signal to the dead zone setting portion after the lapse of a predetermined time period. If and when the dead zone setting portion 7 is supplied with the time output signal from the timer circuit 8, the dead zone setting portion 7 provides the comparator 5 with the second dead zone having the width $\beta$ by gradually decreasing the width $\alpha$ of the first dead zone so far obtained.

Figure 4:
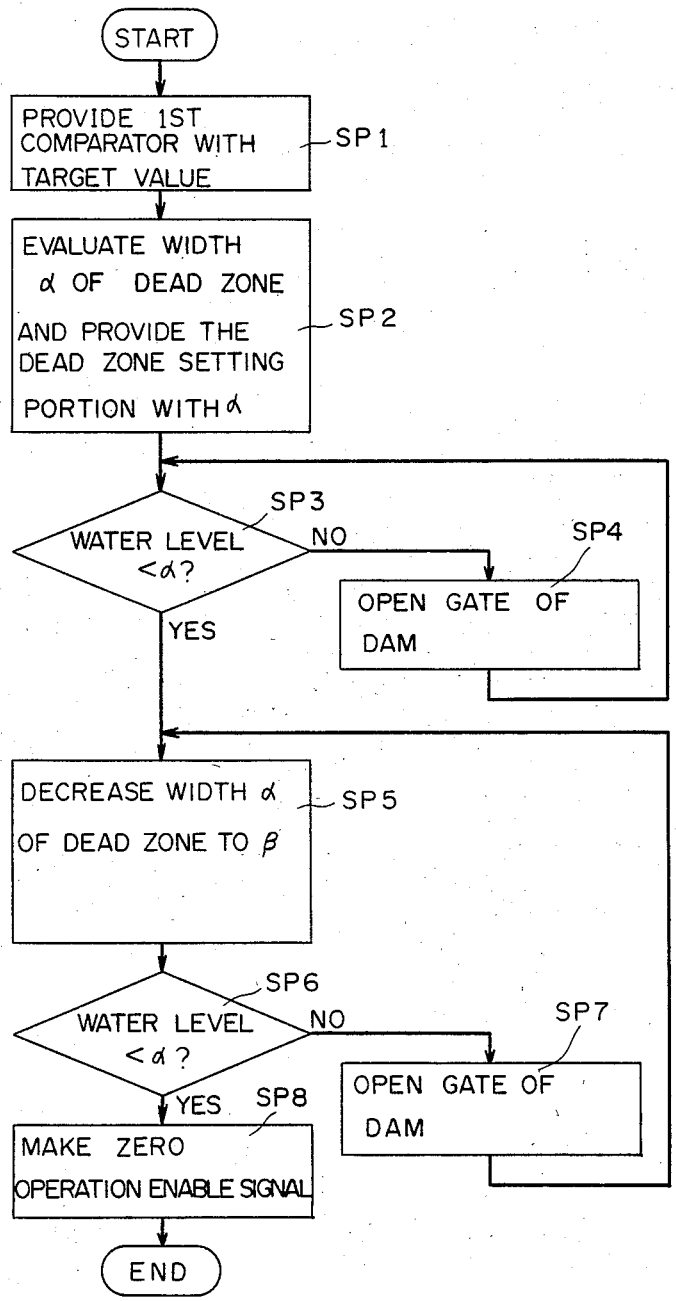
FIG. 4 is a flow diagram for explaining an operation of one embodiment of the present invention.
Figure 5:
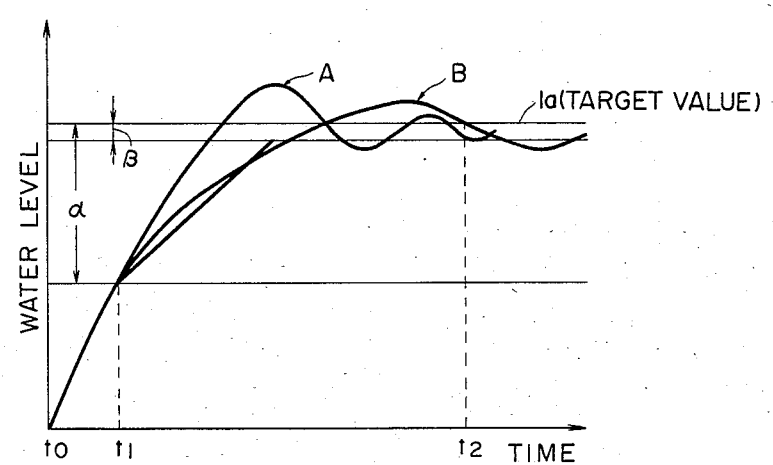
FIG. 5 is a graph showing a change of the control amount in the FIG. 3 feedback automatic control apparatus.

FIG. 4 is a flow diagram for explaining an operation of one embodiment of the present invention, and FIG. 5 is a graph showing a change of the control amount in the FIG. 3 feedback automatic control apparatus.

Now referring to FIGS. 3 to 5, a specific operation of one embodiment of the present invention will be described. First at a time t0 at the start of control shown in FIG. 3, the central processing unit 11 provides at the step SP1 the first comparator 2 with a predetermined target value $1a$ and also provides the timer circuit 8 with the operation enable signal $1b$. At the step SP2 the central processing unit 11 is responsive to the detected output from the water level sensor 4 obtained through the input/output interface 14 and the target value $1a$ to evaluate the width $\alpha$ of the dead zone at the beginning (the first dead zone), thereby to provide the dead zone setting portion 7 with the evaluated result through the input/output interface 14.

At the step SP3 the first comparator 2 compares the target value $1a$ and the detected output from the water level sensor 4, thereby to determine whether the current water level amount corresponds with the target value. If and when the current water level amount does not correspond with the target value, a deviation within the current water level amount and the target value is evaluated and the deviation value is applied to the second comparator 5. The second comparator 5 compares the width $\alpha$ of the first dead zone set in the dead zone setting portion 7 and the deviation, thereby to provide a gate drive circuit 6 with the operation enable signal at the step SP4, if and when the deviation does not exceed the width $\alpha$ of the dead zone. More specifically, the second comparator 5 provides an operation enable signal such that the gate of the dam is opened if and when the current water level is higher than the target value. As a result, the gate of the dam is opened and the water level is decreased. The control amount at that time, i.e. the opening/closing amount of the gate is increased abruptly as shown in FIG. 5.

The central processing unit 11 evaluates at the step SP5 a time dependent change of the current water level supplied from the water level sensor 4. Then the central processing unit 11 is responsive to the target value $1a$, the width $\alpha$ of the dead zone and the time dependent change of the water level to set timer circuit 8 a start timing t1 to decrease the desired dead zone to decrease the width α of the dead zone to the width β of the second dead zone, and a decreasing time period in which the width α of the dead zone is gradually decreased to reach the width β of the dead zone. If and when a time corresponding to the start timing t1 for decreasing the dead zone set in the timer circuit 8 is counted, the output signal is supplied to the dead zone setting portion 7. Accordingly, the dead zone setting portion 7 starts a decrease of the width α of the first dead zone. More specifically, after the timer circuit 8 provides the above described output signal, each time at a time period corresponding to the decreasing time period set as described previously is counted, the output signal is applied to the dead zone setting portion 7. Each time the output signal is supplied from the timer circuit 8, the dead zone setting portion 7 successively decreases the width α of the dead zone for every predetermined width. The purpose is to decrease the frequency of the gate being opened or closed by making the period for decreasing the width α of the dead zone gradual, in the case where the detected water level is abruptly changed, and to shorten the period for decreasing the width α of the dead zone, if and when the change of the water level is conversely gradual.

The second comparator 5 determines at the step SP6 whether the deviation obtained from the first comparator 2 is in the range of the width α of the dead zone for gradually decreasing as described above. If and when the deviation is not within the range of the width α of the dead zone, an operation enable signal is applied at the step SP7 to the gate driving circuit 6 so that the deviation may fall within the range of the width α of the dead zone. The second comparator 5 causes the operation enable signal to have a zero value at the step SP8, if and when the current water level becomes approximately equal to the target value.

Figure 2:
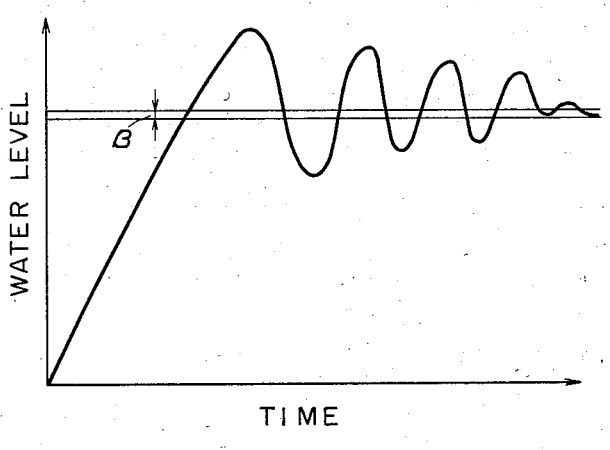
FIG. 2 is a graph showing a change of the control amount in the conventional feedback automatic control apparatus.

Therefore, according to the embodiment shown, if and when the control amount at the start of control abruptly rises as shown in FIG. 5 so that the same exceeds the width α of the first dead zone having a relatively wide width, the control amount is decreased; however, since the control amount as decreased at that time is included in the width α of the dead zone, the control amount as changed does not largely exceed the width α of the dead zone even if the control amount is again increased. Accordingly, an overshoot of the control amount with respect to the target value at the start of control as shown in FIG. 2 can be decreased and therefore the operation frequency of the machine being controlled can be decreased.

In a steady state after the start of control, the gate is controlled such that the water level at that time may fall within the range of the dead zone of the width α which is relatively narrow, the water level can be made to correspond with approximately the target value, whereby the accuracy of control can be enhanced. Furthermore, since the time period when the width β of the first dead zone is decreased up to the width α of the second dead zone can be changed in accordance with the change of the current water level, an object being controlled can be feedback controlled in best adaptation to a change of the water level.

Although the above described embodiment was described as embodied in a feedback automatic control apparatus for opening or closing a gate of a dam, the present invention is not limited to such application and the present invention can be applied to any other types of feedback automatic control apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A feedback automatic control apparatus for performing feedback control such that a control amount with which an object being controlled may correspond with a target value, comprising:
   first dead zone setting means for setting a first dead zone including said target value and having a first width,
   second dead zone setting means for setting a second, non-zero dead zone including said target value and having a width narrower than that of said first dead zone and being entirely within the first dead band,
   means for measuring time elapsed from a start of control toward the target value, and
   control means for controlling said object being controlled such that the control amount of said object being controlled falls within the range of said first dead zone as derived from said first dead zone setting means at the start of control and for controlling said object being controlled such that said control amount of said object being controlled falls within the range of the second dead zone as derived from said second dead zone setting means after the lapse of a predetermined time period after said start of control measured by said elapsed time measuring means, said control means comprising means responsive to (a) said target value, (b) the first dead zone as derived from said first dead zone setting means and (c) a current control amount for gradually decreasing as a function of time the width of said first dead zone set in said first dead zone setting means to the width of said second dead zone set in said second dead zone setting means.

2. A feedback automatic control apparatus in accordance with claim 1, wherein
   said control means comprises timer means responsive to a time dependent change of a current control amount and said target value for providing a timing signal for gradually decreasing as a function of time the width of said first dead zone to the width of the second dead zone.

3. A feedback control method for controlling a variable parameter to obtain a target value, comprising the steps of:
   presetting a first dead zone having a first width and including the target value of said parameter;
   measuring elapsed time following a start of control toward the target value;
   controlling, with the first dead zone, the parameter to approach said target value so the parameter is within the first dead zone; and
   after a predetermined time period after said start of control, controlling, with a second, non-zero dead zone having a width wholly within and narrower than that of the first dead zone and including said target value, the parameter to approach said target value so the parameter is within the second dead zone, said second dead zone being obtained by gradually decreasing as a function of time the width of said first dead zone after said predetermined time period.

4. A feedback control apparatus for energizing an actuator so a variable controlled by the actuator approaches a set point value comprising means responsive to a signal having a magnitude indicative of a monitored value of the variable and the set point value for deriving an error signal having a magnitude indicative of the deviation of the set point and monitored values, means responsive to the error signal for controlling the actuator to cause the variable to approach the set point value, said controlling means including: means for establishing a series of N successive time dependent dead band values for the error signal, where N is an integer greater than 1, the dead band values decreasing only monotonically as the successive time dead band values are derived during a particular series, the actuator being energized only while the error signal magnitude is greater than each of the successive time dependent dead band values.

5. The apparatus of claim 4 wherein the means for controlling the actuator drives the actuator to fully on and off conditions in response to the error signal magnitude being respectively greater than and less than each of the successive time dependent dead band values.

6. The apparatus of claim 4 wherein the variable is height of water in a dam and the actuator is a gate of the dam, the means for controlling the gate driving the gate to fully opened and fully closed positions in response to the error signal magnitude being respectively greater than and less than each of the successive time dependent dead band values.

7. The apparatus of claim 6 further including means for measuring the height of water in the dam.

8. The apparatus of claim 4 wherein N is greater than 2.

9. A feedback control method for energizing an actuator so a variable controlled by the actuator approaches a set point value comprising monitoring the value of the variable, responding to the monitored value of the variable and the set point value to derive an error signal having a magnitude indicative of the deviation of the set point and monitored values, in response to the error signal controlling the actuator to cause the variable to approach the set point value, said controlling step including: establishing a series of N successive time dependent dead band values for the error signal, where N is an integer greater than 1, the dead band values decreasing only monotonically as the successive time dependent dead band values are derived during a particular series, the actuator being energized only while the error signal magnitude is greater than each of the successive time dependent dead band values.

10. The method of claim 9 wherein the actuator is driven to fully on and off conditions in response to the error signal magnitude being respectively greater than and less than each of the successive time dependent dead band values.

11. The method of claim 10 wherein the variable is height of water in a dam and the actuator is a gate of the dam, the gate being driven to fully opened and fully closed positions in response to the error signal magnitude being respectively greater than and less than each of the successive time dependent dead band values.

12. The method of claim 11 wherein the monitoring step includes measuring the height of water in the dam.

13. The method of claim 9 wherein N is greater than 2.

14. A method of controlling a parameter with an actuator comprising the steps of:
 (a) establishing a target value for the parameter,
 (b) monitoring the value of the parameter,
 (c) setting an initial dead band zone including the set point value for the actuator at the time the target value is established,
 (d) gradually reducing in only a monotonic manner the width of the dead band zone for the established target value from the intial dead band zone as control time for the parameter increases, whereby the dead band zone has a time dependent gradually decreasing monotonic variable value,
 (e) comparing the monitored and target values for the parameters to derive an indication of an error between them,
 (f) comparing the indicated error between the monitored and target values with the time dependent gradually decreasing monotonic variable value for the dead band zone, and
 (g) in response to comparing step (f) controlling said actuator so the parameter is varied toward the target value only when the error indication of step (e) is greater than the time dependent decreasing monotonic variable value for the dead band.

15. The method of claim 14 wherein the target value is at one extreme end of values in the dead band zone.

16. The method of claim 14 wherein the actuator is respectively driven to fully activated and fully deactivated states when the error indication of step (e) is greater and less than the time dependent gradually decreasing monotonic variable value for the dead band.

17. The method of claim 14 wherein the parameter is height of water in a dam, and the actuator includes a gate of the dam, the gate being respectively driven to fully open and fully closed states when the error indication of step (e) is greater and less than the time dependent gradually decreasing monotonic variable value for the dead band.

18. Apparatus for controlling a parameter with an actuator in response to an indication of a value of the parameter comprising:
 (a) means for establishing a target value for the parameter,
 (b) means for setting an initial dead band zone including the set point value for the actuator at the time the target value is established,
 (c) means for gradually reducing in only a monotonic manner the width of the dead band zone for the established target value from the initial dead band zone as control time for the parameter increases, whereby the dead band zone has a time dependent gradually decreasing monotonic variable value,
 (d) means for comparing the monitored and target values for the parameters to derive an indication of an error between them,
 (e) means for comparing the indicated error between the monitored and target values with the time dependent gradually decreasing monotonic variable value for the dead band zone, and
 (f) means responsive to comparing means (e) for controlling said actuator so the parameter is varied toward the target value only when the error indication derived by comparing means (d) is greater than the time dependent gradually decreasing monotonic variable for the dead band.

19. The apparatus of claim 18 wherein said controlling means includes means for energizing the actuator so that the actuator is respectively driven to fully activated and fully deactivated states when the error indication of comparing means (d) is greater and less than the time dependent gradually decreasing monotonic variable value for the dead band.

20. The apparatus of claim 18 wherein the parameter is height of water in a dam, the target value being a maximum value for the water height in the dead band zone, said controlling means including means for energizing the gate so the gate is respectively fully open and fully closed when the error indication of comparing means (d) is greater and less than the time dependent gradually decreasing monotonic variable value for the dead band.

* * * * *